(12) United States Patent
Wickramasuriya et al.

(10) Patent No.: US 10,796,344 B2
(45) Date of Patent: Oct. 6, 2020

(54) SECOND SCREEN ADVERTISEMENT CORRELATION USING SCHEDULING INFORMATION FOR FIRST SCREEN ADVERTISEMENTS

(71) Applicant: ARRIS Enterprises, Inc., Suwanee, GA (US)

(72) Inventors: Jehan Wickramasuriya, St. Charles, IL (US); Venugopal Vasudevan, Palatine, IL (US); Faisal Ishtiaq, Chicago, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 348 days.

(21) Appl. No.: 14/482,338

(22) Filed: Sep. 10, 2014

(65) Prior Publication Data

US 2015/0073924 A1 Mar. 12, 2015

Related U.S. Application Data

(60) Provisional application No. 61/877,024, filed on Sep. 12, 2013.

(51) Int. Cl.
*G06Q 30/02* (2012.01)

(52) U.S. Cl.
CPC .............................. *G06Q 30/0277* (2013.01)

(58) Field of Classification Search
CPC ..... H04N 21/4126; G06Q 30/00; G06Q 30/02
(Continued)

(56) References Cited

U.S. PATENT DOCUMENTS 6,658,662 B1   12/2003   Nielsen
8,321,887 B2   11/2012   DuBose
(Continued)

FOREIGN PATENT DOCUMENTS

WO   2002071264   9/2002
WO   2013040533   3/2013

OTHER PUBLICATIONS

Hanson; Kevin; "Multi-Screen Advertising: Cross-Screen Engagement from TV to Mobile", Mad Mobile News; Mar. 26, 2013.

*Primary Examiner* — Marilyn G Macasiano
(74) *Attorney, Agent, or Firm* — Chernoff, Vilhauer, McClung & Stenzel, LLP

(57) ABSTRACT

A first screen schedule for the linear delivery of video content is received and analyzed. The first screen schedule may include slots in which first screen advertisements could be displayed. Particular embodiments can then determine the feasibility of providing second screen advertisements based on the first screen schedule. Then, second screen advertisements that advertisers wish to display in conjunction with first screen advertisements are determined. When the linear delivery of the video content commences, particular embodiments monitor a messaging stream associated with the delivery of the video content. When an ad placement marker is encountered, an ad server may select a first screen advertisement. When the first screen advertisement is placed, the messaging stream identifies a first screen advertisement that is delivered. If the first screen advertisement has a corresponding second screen advertisement, particular embodiments output the second screen advertisement on a second screen environment.

18 Claims, 5 Drawing Sheets

(58) Field of Classification Search
USPC .............................. 348/734; 725/23, 32, 40
See application file for complete search history.

(56) References Cited

U.S. PATENT DOCUMENTS

| | | | |
|---|---|---|---|
| 8,484,676 B1* | 7/2013 | Narsimhan | H04N 21/4126 |
| | | | 348/734 |
| 9,288,550 B2* | 3/2016 | Khare | H04N 21/26241 |
| 2013/0174188 A1 | 7/2013 | Gagnon et al. | |
| 2013/0179917 A1 | 7/2013 | Gu et al. | |
| 2014/0282677 A1* | 9/2014 | Mantell | H04N 21/4722 |
| | | | 725/23 |
| 2014/0282697 A1* | 9/2014 | Sinha | H04H 60/40 |
| | | | 725/32 |

* cited by examiner

SECOND SCREEN ADVERTISEMENT CORRELATION USING SCHEDULING INFORMATION FOR FIRST SCREEN ADVERTISEMENTS

CROSS-REFERENCES TO RELATED APPLICATIONS

The present disclosure claims priority to U.S. Provisional App. No. 61/877,024, entitled "Triggering Second-Screen Advertisements with Call-To-Action", filed Sep. 12, 2013, the contents of which is incorporated herein by reference in its entirety.

BACKGROUND

Advertisements and advertising campaigns are typically created for video content that is displayed on a first screen device, such as a television. The video content is typically broadcast over a broad area, such as an entire country. However, regional affiliates may be responsible for the broadcast in various regions, such as in the northeast region, western region, etc. Each regional affiliate may offer local ad insertion, which allows different geographical areas to insert different local advertisements into the broad television broadcast. For example, a local ad for a local business may be inserted into a broadcast of video content on a specific channel.

Users also use secondary devices, such as tablet devices, smartphones, etc., which provide multi-screen advertising opportunities. For example, a second screen advertisement may be output in conjunction with an advertisement playing on the first screen. However, most local advertisers have not taken advantage of the second screen opportunities due to the difficulty in creating second screen advertisements and coordinating them with the display of the first screen advertisements, which may be because of the cost and effort associated with the creation and coordination of the second screen advertisements.

DETAILED DESCRIPTION

Described herein are techniques for a second screen advertisement system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide the synchronization of second screen advertisements with first screen advertisements. In one embodiment, a first screen schedule for the linear delivery of video content is received and analyzed. The first screen schedule may include slots in which first screen advertisements could be displayed. The first screen schedule does not schedule exactly which advertisements are to be played. Rather, the first screen schedule loosely schedules a group of local advertisements that could be played in the slots. The actual advertisement insertion occurs dynamically when the video content is being delivered. Because there is some kind of idea of which first screen advertisements may be displayed and when, particular embodiments can then determine the feasibility of providing second screen advertisements based on the first screen schedule. Then, second screen advertisements that advertisers wish to display in conjunction with first screen advertisements are determined. For example, advertisers may be contacted and indicate which second screen advertisements are desired.

When the linear delivery of the video content commences, particular embodiments monitor a messaging stream associated with the delivery of the video content. The messaging stream may include markers that indicate when first screen advertisements are successfully placed in the delivery of the video content to the first screen environment. For example, when an ad placement marker is encountered, an ad server may select a local advertisement to be spliced into the stream. When the local advertisement is placed, the messaging stream identifies a first screen advertisement that is delivered. If the first screen advertisement has a corresponding second screen advertisement, particular embodiments output the second screen advertisement on a second screen environment. For example, a second screen advertisement is output on a tablet device when the first screen advertisement is displayed. Particular embodiments may then monitor analytics for the second screen advertisement, such as a click-through rate. These analytics may be correlated to the first screen advertisement.

System Overview

Figure 1A:
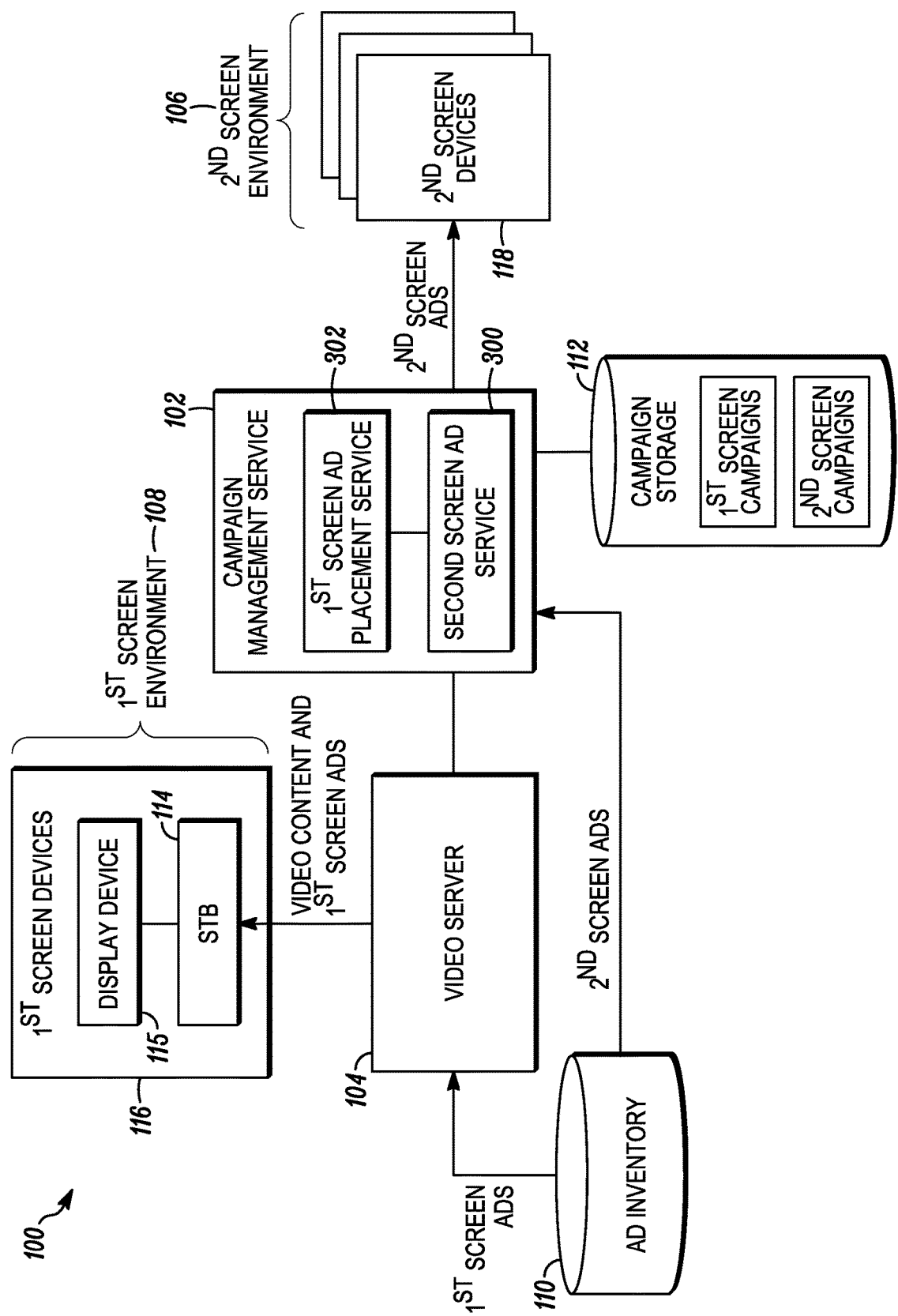
FIG. 1A depicts a system for managing second screen advertisements according to one embodiment.

FIG. 1A depicts a system 100 for managing second screen advertisements according to one embodiment. System 100 includes a campaign management service 102, a video server 104, a second screen environment 106, a first screen environment 108, ad inventory storage 110, and ad campaign storage 112.

First screen environment 108 may include various first screen devices 116, such as a set top box (STB) 114 and a display device 115. Although the set top box 114 is described, other devices may be appreciated, such as cable modems, media terminal adapters, televisions equipped with set top boxes, and other customer premises equipment. Set top box 114 and display device 115 are configured to display video content and also advertising content received from video server 104. In one example, set top box 114 may dynamically insert the local advertisements into ad slots during the linear delivery of video content, and in other cases video server 104 may insert the local advertisements.

A local advertisement may be associated with a certain targeted characteristic, such as a region, user, etc. In this case, the local advertisement may not be shown uniformly across the broad delivery of the video content. For example, a local advertisement in the northeast region of the United States may be different from a local advertisement in the southern region of the United States. Although local advertisements are described, it will be understood that particular embodiments may be used with other types of advertisements, such as broad based advertisements that are not targeted to a characteristic, or not locally targeted.

Second screen environment 106 may include second screen devices 118. As described above, second screen devices 118 may be different from first screen devices 116, and a user may use second screen devices 118 in conjunction with first screen devices 116. For example, a user may use a tablet device or smartphone while watching the video content on first screen device 116. Video server 104 and campaign management service 102 may be part of a video delivery platform, such as a multiple system operator (MSO), and includes various computing, storage, and transmission equipment to transmit the video to first screen environment 108 and second screen advertisements to second screen environment 106. The MSO may operate cable and/or direct broadcast satellite television systems.

In one embodiment, video server 104 delivers video content linearly to first screen environment 108. The linear delivery of content may be where programs are delivered at pre-scheduled times that they are offered. For example, particular channels may offer programs on a pre-set schedule. This content may be delivered linearly to first screen environment 108. In this case, users do not request the content on-demand. Although linear content delivery is described, it will be understood that certain forms of on-demand requesting of content may be appreciated and used in particular embodiments.

Campaign management service 102 may coordinate the display of first screen advertisements and second screen advertisements. In one example, campaign storage 112 may store characteristics about advertisement campaigns. These characteristics define how the first screen advertisements are included in video content delivery to first screen environment 108. Also, the characteristics may govern when second screen advertisements may be displayed. Particular embodiments allow first screen campaigns to be extended to include a second screen campaign. Additionally, other characteristics may determine when second screen advertisements are to be displayed to the user (e.g., based on user-attention, device context—e.g., if the device is in use, if a particular application is in use, the location of the device etc.). In one example, an advertiser may only specify that first screen advertisements should be displayed. However, in other examples, the characteristics may indicate requirements where a second screen advertisement may be displayed in conjunction with the first screen advertisement. In this case, the characteristics may indicate requirements that trigger when the second screen advertisement should be displayed. Examples of triggers may include "display a second screen advertisement when the location or region of the first screen advertisements is "X" location", "display a second screen advertisement when the first screen advertisement is displayed during certain times on certain channels", etc. For example, the characteristics may indicate that if a first screen advertisement is displayed during a certain time slot, then a second screen advertisement should be also displayed. Using these characteristics, campaign management service 102 may automatically determine whether an advertiser would possibly like to display a second screen advertisement.

In other cases, the advertiser may specify that they would be interested in a second screen advertisement, but need to approve the display. In this case, when campaign management service 102 determines a second screen advertisement opportunity is available, campaign management service 102 may contact the advertiser to ask if the advertiser would like to have a second screen advertisement played if the first screen advertisement is inserted in the video content delivery.

As mentioned above, an ad insertion schedule of video content delivery is available before the delivery of content. Particular embodiments leverage this schedule to determine second screen advertisement opportunities. In one embodiment, the ad insertion schedule may be a Society of Cable Telecommunications Engineers (SCTE) schedule, such as an SCTE-130 or SCTE-35 schedule. The term "SCTE schedule" will be used for discussion purposes herein, but it will be understood that other ad insertion schedules may be used. The SCTE schedule may signal an advertisement insertion opportunity in the video content. The advertisements may not be hard-coded into the video content. Rather, the SCTE schedule includes available time slots in which video server 104 may insert advertisements dynamically. For example, the MSO may offer advertisement time slots to advertisers during programs, such as television programs. This allows the MSO to change the advertisement inserted based on various factors, such as location, air time, or personal preference, such as in user targeting.

When video server 104 delivers the video content, it is sent in a transport stream to first screen devices 116. The SCTE schedule may reserve ad slots by providing ad markers in the transport stream to signal where an ad can be placed in the transport stream. For example, the beginning of the ad slot may include a first marker that indicates the beginning of this ad slot and then a second marker may indicate the end of the ad slot. When video server 104 encounters these markers, video server 104 may insert a first screen advertisement in the ad slot. In other embodiments, set top box 116 may dynamically insert first screen advertisements when the markers are encountered.

Figure 1B:
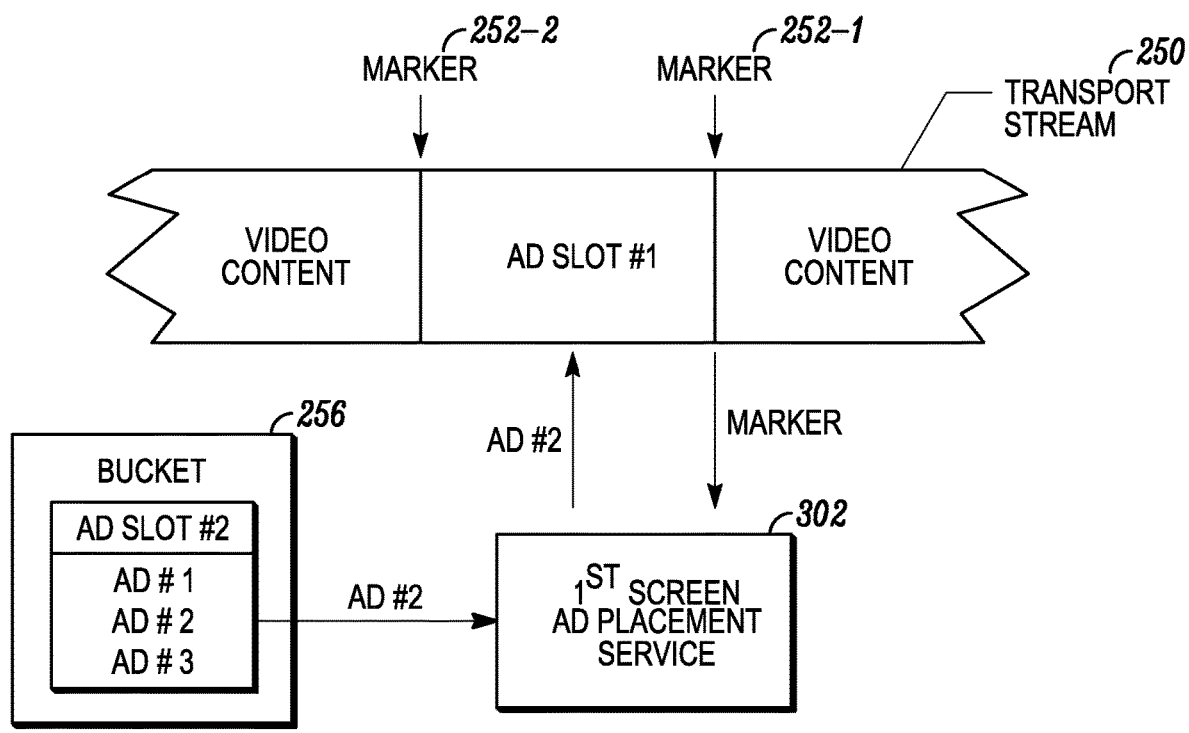
FIG. 1B depicts an example of the ad insertion process according to one embodiment.

In one embodiment, video server 104 may use a first screen ad placement service 302 to determine the advertisement to insert. First screen ad placement service 302 may be included in campaign management service 102, but may be a separate entity, such as first screen ad placement service 302 may be part of an ad server or even video server 104. FIG. 1B depicts an example of the ad insertion process according to one embodiment. A transport stream 250 may be a transcoded stream of video content. Within the transport stream, markers 252 are included to designate ad slots, such as a marker 252-1 that designates the beginning of an ad slot #1 and marker 252-2 that designates the end of the ad slot #1. Ad slot #1 in the initial transport stream does not have an advertisement inserted.

When marker 252-1 is encountered, video server 104 calls a first screen ad placement service 302 to determine a first screen advertisement to place in transport stream 250. The SCTE schedule may have loosely scheduled advertisements for ad slot #1 into a bucket 256. As shown, three advertisements of Ad #1, Ad #2, and Ad #3 are eligible to be placed in ad slot #1. First screen ad placement service 302 selects one of these ads before delivery of the video content, such as Ad #2 in this example, and video server 104 inserts ad #2 into the transport stream.

Referring back to FIG. 1A, the SCTE schedule may be generated based on first screen campaign characteristics. For example, campaign management service 102 may provide first screen advertisement characteristics to a schedule generator (not shown). The schedule generator may determine which first screen advertisements should be delivered with particular video content. Then, the schedule generator generates the SCTE schedule before the delivery of the video content. As described in FIG. 1B, the first screen advertisements may be loosely scheduled into buckets 256 that indicate the first screen advertisements may be displayed in certain ad slots. It is up to first screen ad placement service 302 to make the final decision on which first screen advertisements are scheduled in which ad slots when the video content is delivered to first screen environments 108. For example, first screen ad placement service 302 may determine a first screen advertisement from the buckets in the SCTE schedule to deliver in a specific ad slot.

In one embodiment, first screen ad placement service 302 may determine which first screen advertisement to insert into the ad slot based on the first screen campaign characteristics. In one example, first screen ad placement service 302 may analyze a bucket 256 for an ad slot, which indicates which advertisements are loosely scheduled to be displayed in an ad slot, and then first screen ad placement service 302 selects one of those advertisements to be displayed in a particular ad slot.

Video server 104 may then retrieve the first screen advertisement from ad inventory 110 and insert the first screen advertisement into the transport stream being sent to first screen environment 108. Set top box 114 may receive the first screen advertisement and display it on display device 115.

In other embodiments, video server 104 may not perform the insertion in the transport stream. Rather, set top box 114 may receive the first screen advertisements prior to the encountering of the ad slot, and then set top box 114 may determine which advertisement to insert. In this case, the first screen advertisements that were loosely scheduled may be sent to set top box 114 prior to the linear delivery of the video content. Set top box 114 may then determine which advertisement to insert, and does not need to download the advertisement.

Although the exact first screen advertisement is selected dynamically from bucket 256 while the video content is being delivered, particular embodiments can perform processing for second screen advertisements prior to the delivery of the video content. For example, particular embodiments leverage the SCTE schedule to narrow the number of possible second screen advertisements that could be displayed in conjunction with the first screen advertisements. Campaign management service 102 may use which first screen advertisements are loosely scheduled in the pre-generated SCTE schedule and determine the feasibility of providing a second screen advertisement in conjunction with any of the first screen advertisements. This may involve determining which of the scheduled first screen advertisements have available second screen campaigns. Then, campaign management service 102 may communicate with advertisers to determine whether or not they would like second screen advertisements to be played in conjunction with the first screen advertisements. In other embodiments, campaign management service 102 uses the second screen campaign characteristics to automatically determine which second screen advertisements should be displayed. Using the example in FIG. 1B, campaign management service 102 may determine that Ads #1-3 are possible during an ad slot #1. Campaign management service 102 can then determine if Ads #1-3 have any corresponding second screen advertisement opportunities.

As described above, advertisers may then specify they are interested in second screen advertisements or campaign management service 102 may automatically determine second screen advertisements should be possibly displayed. Campaign management service 102 may then generate a second screen schedule that describes which second screen advertisements should be displayed. For example, an advertiser may specify that if one of the loosely scheduled first screen advertisements is displayed on channel "X" at around "Y" time, then display a corresponding second screen advertisement. This allows campaign management service 102 to narrow down the channels that are being monitored because not every channel may have a possible second screen advertisement opportunity during a time period.

When video server 104 delivers the video content, second screen ad service 300 may monitor the transport stream for the delivery of the video content (e.g., a transport stream of the video content being delivered on a channel) to determine when and which first screen advertisements are inserted in the video content by video server 104. Second screen ad service 300 may be software that sits on top of first screen ad placement service 302 gaining access to the placement requests and responses going out and being executed by the video server 104. Second screen ad service 300 may also be located in other entities, such as video server 104 or a separate entity. As discussed above, second screen ad service 300 may only monitor certain transport streams based on the second screen schedule determined based on the feasibility analysis. For example, only certain channels may be displaying first screen advertisements at a certain time that have an associated second screen advertisement. Second screen ad service 300 thus only monitors these transport streams during the time period the first screen advertisements with corresponding second screen advertisements are loosely scheduled. When second screen ad service 300 receives an indication that the first screen advertisement with a corresponding second screen advertisement has been placed in the transport stream, second screen ad service 300 may send the corresponding second screen advertisement to a second screen device 118. For example, any users that have second screen devices enabled and are receiving the first screen advertisement may have a second screen advertisement sent.

Accordingly, particular embodiments provide an automated way to generate second screen advertisements in conjunction with first screen advertisements. The method may narrow down which second screen advertisements are possible. Further, second screen ad service 300 is simplified in that the processing of the second screen campaigns is enhanced. That is, without using the SCTE schedule and performing the feasibility analysis, second screen ad service 300 may have to dynamically determine if a second screen advertisement is available at the time when receiving an indication that the first screen advertisement has been inserted in the transport stream. This may not be feasible for second screen ad service 300 to perform in real time, or may take a large amount of computing resources. Further, this does not allow for advertisers or users to confirm whether a second screen advertisement should be displayed in correspondence with the first screen advertisement. Second screen ad service 300 provides a more efficient processing for second screen campaigns that cannot be provided without using a computing device.

Also, as will be discussed in more detail below, second screen ad service 300 may monitor second screen analytics derived with the delivery of the second screen advertisements to second screen devices 118. This may include the click-through rate or any other action that is performed for the second screen advertisements. The second screen analytics may then be correlated with the first screen advertisements and provided to advertisers.

The following will now describe various features of the system in more detail.

Second Screen Synchronization

Figure 2:
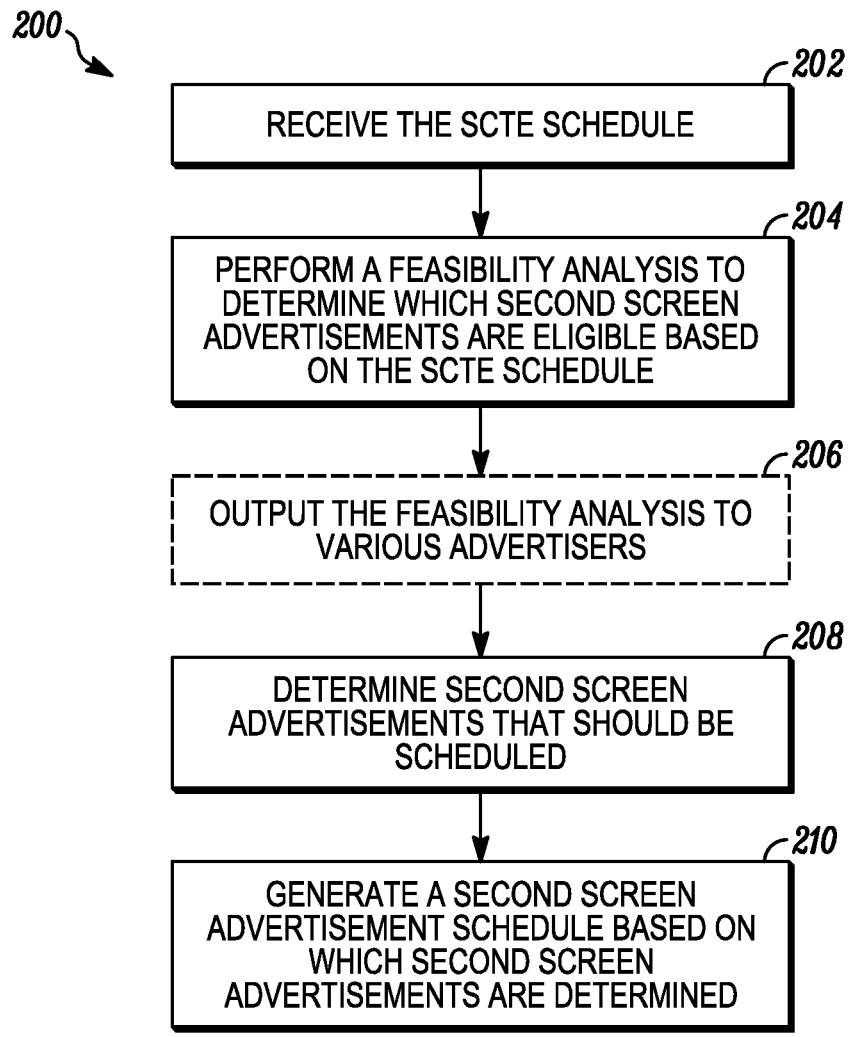
FIG. 2 depicts a simplified flowchart of a method for synchronizing second screen advertisements with first screen advertisements according to one embodiment.

FIG. 2 depicts a simplified flowchart 200 of a method for synchronizing second screen advertisements with first screen advertisements according to one embodiment. At 202, campaign management service 102 receives the SCTE schedule. As described above, the SCTE schedule may loosely schedule first screen advertisements into buckets or possible ad slots. In one embodiment, the SCTE schedule may be received prior to the linear delivery of video content. For example, the SCTE schedule may be generated the day before particular video content is scheduled to be delivered. In other embodiments, the SCTE schedule may be determined at any time previous to the delivery time of video content in the linear delivery.

At 204, campaign management service 102 performs a feasibility analysis to determine which second screen advertisements are eligible based on the SCTE schedule. For example, second screen campaigns may indicate characteristics for second screen advertisements, such as time periods, regions, or other information that can trigger when a second screen advertisement should be displayed in conjunction with a first screen advertisement. Campaign management service 102 uses the characteristics to determine which second screen advertisements are feasible based on the scheduling of the first screen advertisements in the SCTE schedule. This may significantly narrow down the number of second screen advertisements that are possible, which reduces the number of second screen advertisements that need to be reviewed by advertisers or campaign management service 102.

At 206, campaign management service 102 may output the feasibility analysis to various advertisers. For example, the various advertisers may want to determine which second screen advertisements they may want to display in conjunction with the first screen advertisements. Different advertisers may be contacted based on which second screen campaigns they have submitted. Then, the advertisers may respond with an indication of if they would like the second screen advertisement to be displayed if a corresponding first screen advertisement is displayed. Also, if multiple second screen advertisements are possible, the advertisers may indicate which second screen advertisements should be displayed. Although the output of the feasibility analysis to the advertisers is described, campaign management service 102 may automatically determine which second screen advertisements should be displayed in conjunction with the first screen advertisements based on the second screen campaign characteristics. This feasibility analysis can also include ad networks appropriately determining which spots to be associated based on second-screen availability (e.g., based on pricing, etc.). For example, the second screen campaign characteristics may indicate that a second screen advertisement should be displayed if a first screen advertisement is scheduled during a certain time slot for a certain region.

At 208, campaign management service 102 determines second screen advertisements that should be scheduled. For example, campaign management service 102 may receive information from the advertisers selecting second screen advertisements and/or campaign management service 102 may automatically determine which second screen advertisements should be displayed.

At 210, campaign management service 102 generates a second screen advertisement schedule based on which second screen advertisements are determined. As described above, not all first screen ads and/or channels may have corresponding second screen advertisements. Thus, the number of channels that are monitored may be reduced by indicating which channels and which time slots possible second screen advertisements are available. Due to the linear delivery of video content, the time slots (e.g., a specific range of time) can be determined. If the content delivery was non-linear, the time of the day in which the first screen advertisement is scheduled to be played would not be known. At 212, campaign management service 102 may store the second screen advertisement schedule for use when the video content is delivered at a later time according to the SCTE schedule.

Second Screen Advertisement Display

Figure 3:
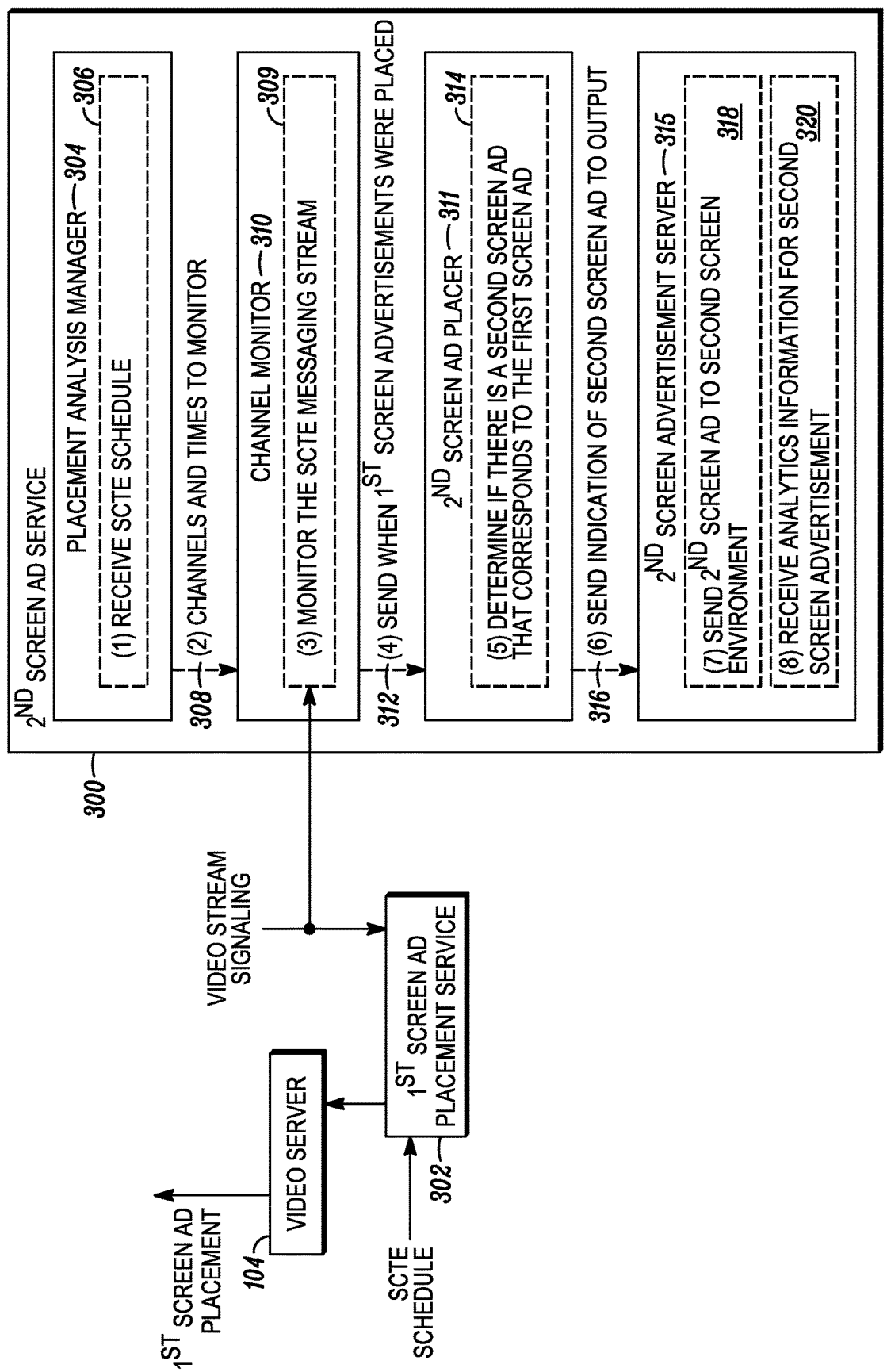
FIG. 3 depicts a more detailed example of the video server and campaign management service according to one embodiment.

Once the second screen schedule is determined, second screen ad service 300 monitors the delivery of video content to determine when to insert second screen advertisements. FIG. 3 depicts a more detailed example of video server 104 and second screen ad service 300 according to one embodiment. First screen ad placement service 302 receives the SCTE schedule and can determine which first screen advertisements to insert in the video content. For example, video server 104 may deliver video content to first screen environment 108, which is sent in a transport stream. First screen ad placement service 302 may monitor the transport stream to determine ad placement markers within the stream. When an ad placement marker is detected in the transport stream, ad placement service 302 places a first screen advertisement into the transport stream based on the SCTE schedule. For example, first screen ad placement service 302 selects one of Ads #1-3 that are eligible for sending during the ad slot #1 from the SCTE schedule. That advertisement is then sent to first screen environment 108 in the transport stream.

To provide the second screen advertisements, a placement analysis manager 304 may receive the second screen schedule at a step #1 (reference 306). At a step #2 (reference 308), placement analysis manager 304 sends the specific transport streams (e.g., channels) and/or times to a channel monitor 310. The streams and times may indicate at what time and which streams channel monitor 310 should monitor for first screen advertisements that are placed. This allows channel monitor 310 to not have to monitor every single channel being transmitted by video server 104 at all times and reduces the amount of processing needed.

At a step #3 (reference 309), channel monitor 310 monitors the SCTE messaging stream for the transport stream that is delivered to first screen environment 108. For example, the SCTE messaging stream may include markers that indicate when first screen advertisements are inserted into the transport stream. Further, the markers may indicate which first screen advertisements ad placement service 302 has successfully placed into the transport stream. At step #4 (reference 312), channel monitor 310 then sends the indications of which first screen advertisements have been inserted into the transport stream to a second screen ad placer 311.

At step #5 (reference 314), second screen ad placer 311 determines if there is a second screen advertisement that corresponds to the first screen advertisement being displayed in first screen environment 108. Because it was not exactly known which first screen advertisement would be placed in the ad slot, once second screen ad placer 311 knows which first screen advertisement was placed, then second screen ad placer 311 can determine whether this first screen advertisement has a corresponding second screen advertisement. For example, for Ads #1-3 that were loosely scheduled in the bucket for the ad slot #1, the actual ad placed may not have a corresponding second screen advertisement.

Second screen ad placer 311 may determine when the second screen advertisement should be displayed based on the second screen schedule received. For example, second screen ad placer 311 determines if Ad #2 has a corresponding second screen advertisement when Ad #2 is actually placed. Assuming there is a corresponding second screen advertisement, in a step #6 (reference 316), second screen ad placer 311 then sends an indication of which second screen advertisement should be output to a second screen advertisement server 315.

In a step #7 (reference 318), second screen advertisement server 315 sends the second screen advertisement to second screen environment 106. Second screen devices 118 may then display the second screen advertisements to users. The second screen advertisements may be of different formats, such as call-to-action advertisements (e.g., phone, click, purchase) that augment the first screen advertisements. In some embodiments, the second screen advertisements may be derived from the first screen advertisements. For example, the first screen advertisements may be altered to generate the second screen advertisements. The alteration may be dynamically performed or pre-determined. Further, second screen advertisement server 315 may dynamically select a second screen advertisement from a group of second screen advertisements.

At a step #8 (reference 320), second screen advertisement server 315 receives analytics information for the second screen advertisement. For example, the analytics information may indicate whether or not a user selected the second screen advertisement, purchased any item associated with the second screen advertisement, or performed any other action. Second screen ad service 300 may correlate this analytics information to the corresponding first screen advertisement. This allows the harmonization of analytics for the delivery of first screen advertisements, such as SCTE analytics (e.g., first screen placement) and second screen analytics (e.g., click-through rate). The coordination between second screen analytics and first screen analytics may be provided because second screen ad service 300 may coordinate the placement of second screen advertisements via monitoring of the SCTE messaging stream. Previously, it might not have been known which first screen advertisements were delivered. However, by monitoring the SCTE messaging stream in the transport stream, second screen ad service 300 knows exactly which first screen advertisements were delivered. Further, since the SCTE signaling is used to trigger second screen advertisements, second screen ad service 300 knows which second screen advertisements were triggered. Second screen ad service 300 may then correlate the analytics for the first screen advertisements and the corresponding second screen advertisements.

Analytics Correlation

Figure 4:
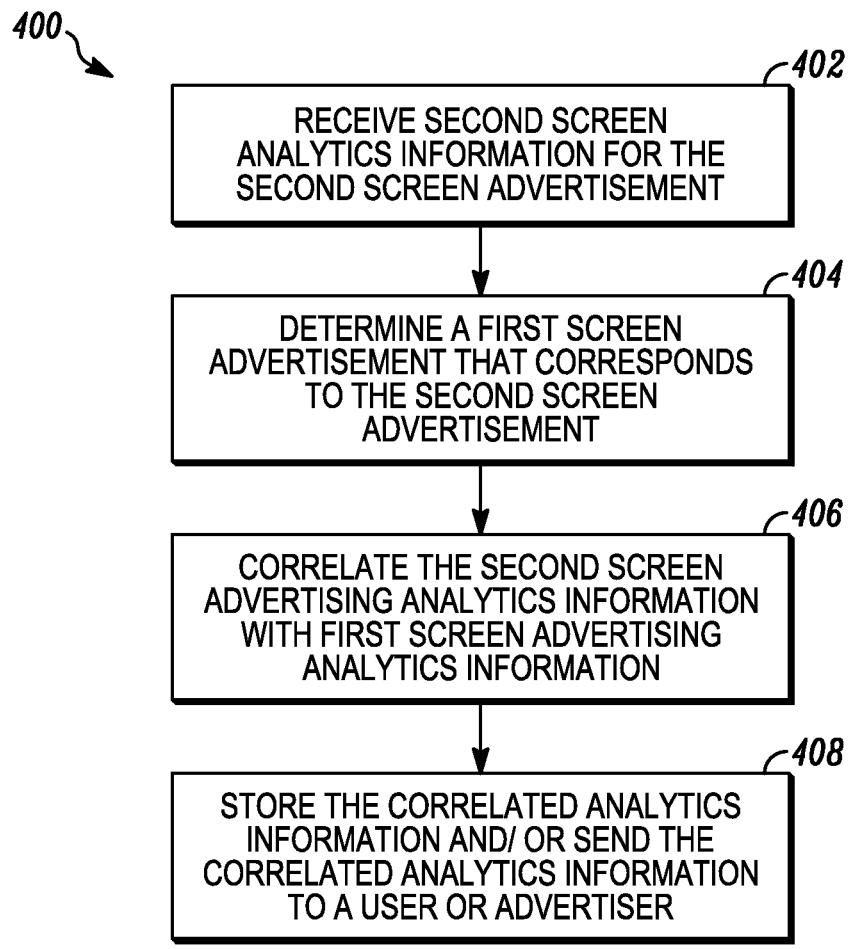
FIG. 4 depicts a simplified flowchart of a method for performing the correlation of first screen advertisements and second screen advertisements according to one embodiment.

FIG. 4 depicts a simplified flowchart 400 of a method for performing the correlation of first screen advertisements and second screen advertisements according to one embodiment. At 402, second screen ad service 300 receives second screen analytics information for the second screen advertisement. The analytics information may identify which second screen advertisement the analytics information has been calculated for.

At 404, second screen ad service 300 determines a first screen advertisement that corresponds to the second screen advertisement. Second screen ad service 300 may determine the corresponding first screen advertisement based on the second screen schedule and the knowledge of which first screen advertisement was actually placed.

At 406, second screen ad service 300 may then correlate the second screen advertising analytics information with first screen advertising analytics information. For example, the time the first screen advertisement was inserted may be included in addition to the second screen advertising analytics, such as the click-through rate. At 408, second screen ad service 300 may store the correlated analytics information and/or send the correlated analytics information to a user or advertiser. This may allow advertisers to see synchronized analytics for the first screen advertisements and the second screen advertisements.

The advertisers may be able to determine the effectiveness of second screen advertisements when the first screen advertisements have been delivered using the analytics information. An additional benefit is that advertisers may be able to correlate second-screen analytics and effectiveness with their first-screen campaigns, which extends the advertisers measurement capabilities, such as beyond television ratings. Also, second screen ad service 300 provides a feedback loop to the first screen advertisements with this correlation of analytics. For example, insights gained via the effectiveness of second-screen campaigns could be fed back into the first screen campaigns such that the first screen campaigns can be adjusted accordingly. For example, if a particular aspect of a product is highlighted via a second-screen ad that ends up being effective (from a second-screen analytics and reporting standpoint), then the advertiser may choose to adjust their first-screen ad assets accordingly (the asset itself, target demographic, time-slot it airs, etc.)

Example

The following provides an example for providing the second screen advertisements. After parsing the first screen SCTE schedule and the second screen campaign characteristics, campaign management service 102 determines the necessary channels/programs to monitor on a regional basis. For example, each region may include a campaign management service 102 that analyzes the local advertisements that could be provided to first screen environments 108.

Second screen ad service 300 may parse SCTE messages, such as SCTE-130 <PlacementRequest/Response> signaling messages, to determine if a first screen ad has successfully been placed and played. The signaling message may include an identifier for a first screen advertisement. Given a successful placement response <PlacementResponse> signaling message for a first screen advertisement, second screen ad service 300 then determines the second screen advertisement to display in second screen environment 106. For example, second screen ad service 300 determines the first screen advertisement identifier and channel information from the messages, and determines if there is a corresponding second screen advertisement to provide. If so, second screen ad service 300 may send the second screen advertisement to second screen devices 118.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for schedule generation and delivery of second screen advertisements to a second screen device, the method comprising:
   in a campaign management server of a video delivery system comprising a video delivery network, wherein the campaign management server is communicatively coupled to the video delivery network, receiving a pre-generated first screen schedule of a linear delivery of content,
      wherein the first screen schedule includes a set of slots in the content in which first screen advertisements are scheduled to be placed in the linear delivery of the content on a first screen environment,
      wherein the campaign management server is in communication with a video server via the video delivery network, wherein the video server is configured to deliver the content and the first screen advertisements to the first screen environment in a transport stream, using a first screen service for advertising placement based on the first screen schedule, and
      wherein the campaign management server comprises a second screen service for delivery of second screen advertisements to a second screen environment comprising one or more second screen devices;
   generating, by the second screen service, a second screen schedule of second screen advertisements based on the first screen schedule, wherein the generating comprises:
      analyzing a set of second screen campaigns and the first screen schedule to determine which second screen campaigns are eligible for displaying a second screen advertisement based on requirements in the set of second screen campaigns, and
      automatically selecting second screen advertisements in the second screen schedule based on the requirements;
   determining, by the second screen service, a set of content streams of the video delivery network to monitor based on the second screen schedule, the set of content streams provided in the video delivery system for the linear delivery of the content to the first screen environment;
   monitoring, by the second screen service, a messaging stream of the video delivery network for the set of content streams;
   determining, by the second screen service, a placement of a first screen advertisement in one of the set of slots from the monitoring of the messaging stream; and
   based upon whether the first screen advertisement is associated with a corresponding second screen advertisement, delivering, by the second screen service, the corresponding second screen advertisement to the one or more second screen devices of the second screen environment for displaying the corresponding second screen advertisement.

2. The method of claim 1, wherein generating the second screen schedule further comprises:
   outputting at least a portion of the second screen campaigns eligible for displaying the second screen advertisement to associated advertisers for the second screen campaigns; and
   receiving an indication from the respective advertisers whether the second screen advertisement should be displayed in conjunction with a corresponding first screen advertisement.

3. The method of claim 1, wherein the second screen schedule lists the set of content streams and a set of times in which to monitor the set of content streams for placement of first screen advertisements.

4. The method of claim 1, wherein the first screen schedule lists a plurality of first screen advertisements that are eligible to be placed in each of the set of slots.

5. The method of claim 4, wherein one of the first screen advertisements is dynamically selected to be placed in each slot in the set of slots from the plurality of first screen advertisements during the linear delivery of the content.

6. The method of claim 4, wherein not all of the plurality of first screen advertisements are selected to be placed in the set of slots.

7. The method of claim 4, wherein:
   a subset of the plurality of first screen advertisements are loosely scheduled in a bucket for a slot in the set of slots, and
   one of the subset of the plurality of first screen advertisements is selected for the slot during the linear delivery of the content.

8. The method of claim 1, wherein monitoring the messaging stream comprises:
   monitoring the messaging stream for a marker that indicates which first screen advertisement was placed in the one of the set of slots; and
   determining whether the first screen advertisement that was placed has a corresponding second screen advertisement from the second screen schedule.

9. The method of claim 1, further comprising:
   receiving analytics information regarding the delivering of the corresponding second screen advertisement; and
   correlating the corresponding second screen advertisement to the first screen advertisement.

10. The method of claim 9, further comprising:
   storing the analytics information for analysis of a performance of the corresponding second screen advertisement or the first screen advertisement.

11. The method of claim 9, wherein correlating the corresponding second screen advertisement to the first screen advertisement is performed based on the determining of the placement of the first screen advertisement and subsequent delivering of the corresponding second screen advertisement to the second screen environment.

12. The method of claim 1, wherein the set of content streams comprise a set of channels in a cable television delivery system.

13. The method of claim 1, wherein the linear delivery of the content includes linear delivery of the content in different regional areas in which different first screen advertisements are placed in the linear delivery of the content.

14. A method for schedule generation and delivery of second screen advertisements to a second screen device, the method comprising:

in a campaign management server of a video delivery system comprising a video delivery network, wherein the campaign management server is communicatively coupled to the video delivery network, receiving a pre-generated first screen schedule of a linear delivery of video content,
  wherein the first screen schedule includes a set of first screen advertisements that are eligible to be placed in the linear delivery of the video content on a first screen environment,
  wherein the campaign management server is in communication with a video server via the video delivery network, wherein the video server is configured to deliver the video content and the first screen advertisements to the first screen environment in a transport stream, using a first screen service for advertising placement based on the first screen schedule, and
  wherein the campaign management server comprises a second screen service for delivery of second screen advertisements to a second screen environment comprising one or more second screen devices;
generating, by the second screen service, a second screen schedule of second screen advertisements based on the first screen schedule and a set of second screen advertisement campaigns that include requirements for displaying a second screen advertisement in conjunction with a first screen advertisement, wherein the generating comprises:
  analyzing the set of second screen advertisement campaigns and the first screen schedule to determine which second screen advertisement campaigns are eligible for displaying the second screen advertisement based on requirements in the set of second screen advertisement campaigns, and
  automatically selecting second screen advertisements in the second screen schedule based on the requirements;
determining, by the second screen service, a set of channels of the video delivery network to monitor based on the second screen schedule, the set of channels provided in the video delivery system that will deliver video content streams that include first screen advertisements eligible to be placed in the video content streams and have corresponding second screen advertisements in the second screen schedule;
monitoring, by the second screen service, a messaging stream of the video delivery network for the set of channels at specified times in which the first screen advertisements are eligible to be placed in the video content streams;
determining, by the second screen service, a placement of a first screen advertisement in one of the specified times from the messaging stream; and
based upon whether the first screen advertisement is associated with a corresponding second screen advertisement, delivering, by the second screen service, the corresponding second screen advertisement to the one or more second screen devices of the second screen environment for displaying the corresponding second screen advertisement.

15. The method of claim 14, wherein monitoring the messaging stream comprises:
monitoring the messaging stream for a marker that indicates which first screen advertisement was placed in the one of the set of slots; and
determining whether the first screen advertisement that was placed has a corresponding second screen advertisement from the second screen schedule.

16. The method of claim 14, wherein the first screen schedule lists a plurality of first screen advertisements that are eligible to be played in a set of slots in the video content streams.

17. The method of claim 14, further comprising:
receiving analytics information regarding the delivering of the corresponding second screen advertisement; and
correlating the corresponding second screen advertisement to the first screen advertisement.

18. An apparatus for schedule generation and delivery of second screen advertisements to a second screen device, the apparatus comprising:
one or more computer processors of a video delivery system, the video delivery system communicatively coupled to a video delivery network; and
a non-transitory computer-readable storage medium comprising instructions that, when executed, control the one or more computer processors to be configured for:
  in a campaign management server of the video delivery system, wherein the campaign management server is communicatively coupled to the video delivery network, receiving a pre-generated first screen schedule of a linear delivery of content,
    wherein the first screen schedule includes a set of slots in the content in which first screen advertisements are scheduled to be placed in the linear delivery of the content on a first screen environment,
    wherein the campaign management server is in communication with a video server via the video delivery network, wherein the video server is configured to deliver the content and the first screen advertisements to the first screen environment in a transport stream, using a first screen service for advertising placement based on the first screen schedule, and
    wherein the campaign management server comprises a second screen service for delivery of second screen advertisements to a second screen environment comprising one or more second screen devices;
  generating, by the second screen service, a second screen schedule of second screen advertisements based on the first screen schedule, wherein the generating comprises:
    analyzing a set of second screen campaigns and the first screen schedule to determine which second screen campaigns are eligible for displaying a second screen advertisement based on requirements in the set of second screen campaigns, and
    automatically selecting second screen advertisements in the second screen schedule based on the requirements;
  determining, by the second screen service, a set of content streams of the video delivery network to monitor based on the second screen schedule, the set of content streams provided in the video delivery system for the linear delivery of the content to the first screen environment;
  monitoring, by the second screen service, a messaging stream of the video delivery network for the set of content streams;

determining, by the second screen service, a placement of a first screen advertisement in one of the set of slots from the monitoring of the messaging stream; and based upon whether the first screen advertisement is associated with a corresponding second screen advertisement, delivering, by the second screen service, the corresponding second screen advertisement to the one or more second screen devices of the second screen environment for displaying the corresponding second screen advertisement.

\* \* \* \* \*